(12) United States Patent
Ganapathiappan

(10) Patent No.: US 8,198,346 B2
(45) Date of Patent: Jun. 12, 2012

(54) ENCAPSULATED PIGMENT

(75) Inventor: Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/831,818

(22) Filed: Jul. 7, 2010

(65) Prior Publication Data

US 2012/0010326 A1    Jan. 12, 2012

(51) Int. Cl.
*C08K 9/00* (2006.01)
*C09D 11/00* (2006.01)
*G11B 5/708* (2006.01)

(52) U.S. Cl. ............... 523/206; 106/31.6; 106/31.13; 106/31.85; 428/842.2

(58) Field of Classification Search ............ 523/206, 523/205, 160–161; 428/407, 842.2; 106/31.85, 106/31.13, 31.6
See application file for complete search history.

(56) References Cited

U.S. PATENT DOCUMENTS

| | | | |
|---|---|---|---|
| 3,806,464 A | 4/1974 | Matrick et al. | |
| 4,950,725 A * | 8/1990 | Flesher et al. | 526/307.6 |
| 5,764,262 A | 6/1998 | Wu et al. | |
| 6,841,591 B2 | 1/2005 | Vincent et al. | |
| 6,858,301 B2 | 2/2005 | Ganapathiappan | |
| 7,354,962 B1 | 4/2008 | Akers et al. | |
| 7,544,418 B2 | 6/2009 | Vincent et al. | |
| 7,553,886 B2 | 6/2009 | Ganapathiappan | |
| 2004/0110867 A1 * | 6/2004 | McCovick | 523/160 |
| 2008/0002004 A1 | 1/2008 | O'Donnell et al. | |
| 2008/0026221 A1 * | 1/2008 | Vincent et al. | 428/407 |
| 2008/0250971 A1 * | 10/2008 | Ganapathiappan | 106/31.85 |
| 2009/0007816 A1 | 1/2009 | Ganapathiappan | |
| 2009/0156730 A1 | 6/2009 | Cha et al. | |
| 2010/0227947 A1 * | 9/2010 | Ganapathiappan et al. | 523/205 |
| 2011/0065834 A1 * | 3/2011 | Ganapathiappan et al. | 523/205 |

* cited by examiner

*Primary Examiner* — Vasu Jagannathan
*Assistant Examiner* — Hannah Pak

(57) ABSTRACT

The present disclosure provides encapsulated pigments, inkjet inks incorporating such pigments, and methods for manufacturing such pigments. In one embodiment, an encapsulated pigment can comprise a pigment, an encapsulating polymer that encapsulates the pigment, and a viscosity modifying polymer particulate that is cross-linked and which is dispersed within the encapsulating polymer.

17 Claims, No Drawings

ENCAPSULATED PIGMENT

BACKGROUND

There are several reasons that ink-jet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to ink-jet ink chemistry, the majority of commercial ink-jet inks are water-based. Thus, their constituents are generally water-soluble, as in the case of many dyes, or water dispersible, as in the case of pigments. Furthermore, ink-jet inks have low viscosity to accommodate high frequency jetting and firing chamber refill processes common to thermal ink-jet architecture.

As ink-jet ink applications have advanced, improvement of such printing systems through ongoing research and developmental efforts continue to be sought, such as in the area of colorant modification.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an ink-jet ink. Liquid vehicles are known in the art, and a wide variety of ink vehicles may be used in accordance with embodiments of the present disclosure. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent.

As used herein, "co-solvent" refers to any solvent, including organic solvents and/or water, present in the ink vehicle, used in dispersing a pigment, or used in polymerization reactions.

As used herein, "pigment" generally includes pigment colorants, magnetic particles, metal oxides such as aluminas, silicas, titanias and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific embodiment, however, the pigment is a pigment colorant.

As used herein, "fully encapsulated" refers to a pigment that is encapsulated by a polymer such that at least 99% of the surface area of the pigment is covered by the polymer.

As used herein, "aqueous solvent system" refers to a solvent system having water as a component. The solvent system may include other co-solvents that are miscible or partially miscible in water.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" refers to nitrogen, oxygen, halogens, phosphorus, or sulfur.

As used herein, "alkyl" refers to a branched, unbranched, or cyclic saturated hydrocarbon group, which typically, although not necessarily, contains from 1 to about 50 carbon atoms, or 1 to about 40 carbon atoms, or 1 to about 30 carbon atoms, for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "lower alkyl" refers to an alkyl group having from 1 to 6 carbon atoms. The term "higher alkyl" refers to an alkyl group having more than 6 carbon atoms, for example, 7 to about 50 carbon atoms, or 7 to about 40 carbon atoms, or 7 to about 30 carbon atoms or more. As used herein, "substituted alkyl" refers to an alkyl substituted with one or more substituent groups. The term "heteroalkyl" refers to an alkyl in which at least one carbon atom is replaced with a heteroatom. If not otherwise indicated, the term "alkyl" includes unsubstituted alkyl, substituted alkyl, lower alkyl, and heteroalkyl.

As used herein, "aryl" refers to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, and benzophenone. The term "substituted aryl" refers to an aryl group comprising one or more substituent groups. The term "heteroaryl" refers to an aryl group in which at least one carbon atom is replaced with a heteroatom. If not otherwise indicated, the term "aryl" includes unsubstituted aryl, substituted aryl, and heteroaryl.

As used herein, $T_g$ is the glass transition temperature as calculated by the Fox equation: copolymer $T_g=1/(W_a/(T_gA)+W_b(T_gB)+ \ldots)$ where $W_a$=weight fraction of monomer A in the copolymer and $T_gA$ is the homopolymer $T_g$ value of monomer A, $W_b$=weight fraction of monomer B and $T_gB$ is the homopolymer $T_g$ value of monomer B, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that a pigment can be encapsulated, or fully encapsulated, with an encapsulating polymer by using viscosity modifying polymer particulates. Additionally, the present encapsulated pigments can be encapsulated with reduced free latex while incorporating linear monomers in an aqueous solvent or aqueous solvent system. As such, the present encapsulated pigments and ink-jet inks can have good stability while providing desired ink-jet performance including printing durable images, having film forming properties, and reliable printing.

In accordance with this, the present disclosure is drawn to encapsulated pigments, ink-jet ink compositions, and methods, where the encapsulated pigment generally comprises a pigment, an encapsulating polymer, and a viscosity modifying polymer particulate. It is noted that when discussing the present pigments, compositions, and associated methods, each of these discussions can be considered applicable to each of these embodiments, whether or not they are explicitly discussed in the context of that embodiment. Thus, for example, in discussing a solvent for use in an ink-jet ink, such a solvent can also be used in a method for manufacturing an encapsulated pigment, and vice versa.

As such, an encapsulated pigment can comprise a pigment, an encapsulating polymer that encapsulates the pigment, and a viscosity modifying polymer particulate that is cross-linked and which is dispersed within the encapsulating polymer.

Additionally, an ink-jet ink can comprise an ink vehicle and any encapsulated pigment disclosed herein dispersed in the ink vehicle. Further, a method for manufacturing an encapsulated pigment can comprise dispersing a pigment in a solvent, adding at least one monomer to the solvent to form a mixture, adding a viscosity modifying polymer particulate that is cross-linked to the mixture, and polymerizing the at least one monomer thereby forming the encapsulated pigment.

The encapsulated pigments described herein can be fully encapsulated. Typically, the encapsulating polymer and the viscosity modifying polymer particulate can individually comprise polymerized monomers individually selected from the group consisting of hydrophobic monomers, hydrophilic monomers, and mixtures thereof.

The hydrophobic monomer can be present in the encapsulating polymer and the viscosity modifying polymer particulate from up to 80 wt %, e.g., in one embodiment, from 20 wt % to 60 wt %. Hydrophobic monomers include, without limitation, styrene, p-methyl styrene, vinyl acetate, methyl methacrylate, hexyl acrylate, hexyl methacrylate, 2-ethylhexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, isobornyl methacrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

Hydrophilic monomers can be present in the encapsulating polymer and the viscosity modifying polymer particulate from up about 0.1 wt % to about 30 wt %. In one embodiment, the hydrophilic monomer can be an acid monomer. Hydrophilic monomers include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, styrene sulfonates, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

The viscosity modifying polymer particulate can be cross-linked with a cross-linker selected from the group of ethylene glycol diacrylate, ethylene glycol dimethacrylate, propylene glycol dimethacrylate, tetraethylene glycol diacrylate, tetraethylene glycol diacrylate, pentaerythritol triacrylate, pentaerythritol tetraacrylate, and the like.

Typically, the encapsulated pigment can have a pigment to viscosity modifying polymer particulate ratio of 1:10 to 1:0.05 by weight. Additionally, the encapsulated pigment can have an encapsulating polymer to viscosity modifying polymer particulate ratio of 10:0.1 to 1:8 by weight. In one embodiment, the encapsulated pigment can comprise about 15 wt % to about 40 wt % of the viscosity modifying polymer particulate.

While the viscosity modifying polymer particulate and the encapsulating polymer can be independent of each other, in one embodiment, the viscosity modifying polymer particulate and the encapsulating polymer can have at least one monomer in common. Additionally, the encapsulating polymer can have at least one monomer different than that of the viscosity modifying polymer particulate. In one embodiment, the encapsulating polymer can include the monomers used in the viscosity modifying polymer particulate with at least one additional monomer. The additional monomer can be a linear monomer.

Generally, the pigments used herein can be any colored pigments and non-colored pigments. In one embodiment, the pigment can be selected from the group of black pigment, white pigment, yellow pigment, cyan pigment, magenta pigment, and mixtures thereof. The pigment can be present in the ink from about 0.1 wt % to about 15 wt % of the ink. In one embodiment, the pigment can be present from about 1 wt % to about 5 wt % of the ink.

The present methods of manufacturing an encapsulated pigment generally comprise dispersing a pigment in a solvent, adding at least one monomer to the solvent to form a mixture, adding a viscosity modifying polymer particulate that is cross-linked to the mixture, and polymerizing the at least one monomer thereby forming the encapsulated pigment. In one embodiment, dispersing the pigment can include adding a dispersant. Additionally, such methods can include emulsifying steps. In one embodiment, forming the emulsion can include adding water and a surfactant. Additionally, the method can include forming an emulsion. In one embodiment, the emulsion can be formed after adding the viscosity modifying polymer particulate to the mixture. In another embodiment, the emulsion can be formed prior to adding the viscosity modifying polymer particulate. Additionally, the viscosity modifying polymer particulate can increases the viscosity of the mixture by about 5 cps to about 200 cps. In one embodiment, the viscosity of the mixture can be increased by about 10 cps to about 50 cps.

In addition to the above method steps, the mixture can be sheared. Such shearing can be part of the emulsion process and/or dispersing process. Shearing can be performed by a paint shaker, microfluidization, and/or sonication. Shearing and/or dispersing equipments can include microfluidizer available from Microfluidic Corporation, ultrasonicator available from Branson and Dispermats available from BYK Gardner. The methods described herein can also include the use of an aqueous solvent system. Additionally, the method can provide an encapsulated pigment that is fully encapsulated. Further, the encapsulated pigment can be prepared by emulsion polymerization techniques such as batch, semi-batch, or mini-emulsion processes.

Generally, the encapsulated pigment can be present in the ink composition in an amount ranging from about 0.5 wt % to about 40 wt %. In one embodiment, the encapsulated pigment can be present in the ink composition in an amount ranging from about 2 wt % to about 8 wt %. As discussed above, the present ranges include all sub-ranges. For example, the self cross-linkable latex particles can be present in the ink composition from about 1 wt % to about 15 wt %, about 1 wt % to about 5 wt %, about 3 wt % to about 40 wt %, about 3 wt % to about 15 wt %, etc.

Additionally, the polymer of the encapsulated pigments can have a $T_g$ ranging from about 0° C. to about 125° C. In one embodiment, the $T_g$ of the polymer can range from about 0° C. to about 75° C. As discussed above, the present ranges include sub-ranges. For example, the polymer can have a $T_g$ from about 35° C. to about 50° C., about 0° C. to about 45° C., about 15° C. to about 75° C., about 20° C. to about 40° C., etc.

Additionally, it is noted that encapsulated pigment described herein can be further stabilized by addition of surfactants. As such, in one embodiment, the encapsulated pigment can further comprise the addition of a reactive surfactant during the polymerization process. Generally, the reactive surfactant contains hydrophobic moieties that can be covalently bound to the surface of a polymeric particle or encapsulating polymer. Additionally, such a reactive surfactant can be incorporated during the polymerization via appropriate organic groups, e.g., a vinyl group, such that the surface of the polymer particles or the encapsulating polymer contains the reactive surfactant. Generally, the reactive surfactant can contain hydrophilic groups that allow the polymeric particles or encapsulating polymer to be dispersed and/or stabilized in an aqueous medium. The hydrophilic groups can be anionic, cationic, nonionic, or zwitterionic. For example, suitable anionic groups include sulfonate, phosphonate, and carboxylate groups; suitable cationic groups include amine groups; and suitable nonionic groups include polyethelyene oxide, imidazole and amido groups. As such, in one embodiment, the reactive surfactants can be functionalized ethylene glycol acrylates, including the SIPOMER® series of surfactants from Rhodia. Other non-limiting examples of reactive surfactants include HITENOL™ (polyoxyethylene alkylphenyl ether ammonium sulfate) and NOIGEN™ (polyoxyethylene alkylphenyl ether) reactive surfactants commercially available from Dai-Ichi Kogyo Seiyaku Co., Ltd. of Japan; TREM® (sulfosuccinates) commercially available from Henkel; and the MAXEMUL® (anionic phosphate ester) reactive surfactants commercially available from Uniqema of the Netherlands. Suitable grades of some of the materials listed above may include HITENOL™ BC-20, NOIGEN™ RN-30, TREM® LT-40, and MAXEMUL® 6106 and 6112.

The ink-jet ink compositions of the present disclosure may also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof. A non-limiting example of a suitable metal material is a metal in foil form made from, for example, at least one of aluminum, silver, tin, copper, alloys thereof, and/or mixtures thereof.

With these parameters in place regarding some of the possible encapsulated pigments that can be formed, a discussion of dispersion fluids, e.g., inks, etc., is useful to exemplify how these encapsulated pigments can be implemented for use in accordance with an embodiment of the present disclosure. Typically, inks can include the encapsulated pigment dispersed in a liquid vehicle. A liquid vehicle formulation that can be used with the encapsulated pigments described herein can include water, and optionally, one or more co-solvents present in total at from 0.1 wt % to 30 wt %, or more, depending on the jetting architecture. Further, one or more non-ionic, cationic, and/or anionic surfactant can optionally be present, ranging from 0.01 wt % to 10.0 wt %. The balance of the formulation can be purified water, or other vehicle components known in the art, such as biocides, viscosity modifiers, materials for pH adjustment, sequestering agents, preservatives, and the like. In one embodiment, the liquid vehicle can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0 wt % to 10.0 wt %. It is to be noted that the surfactant that is described as being usable in the liquid vehicle is not the same as the surfactant that is described as being adhered to the surface of the polymer particles or encapsulating polymer, though many of the same surfactants can be used for either purpose.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Other viscosity modifiers and buffers may also be present, as well as other additives known to those skilled in the art to modify properties of the ink as desired. Such additives can be present at from 0 wt % to 20.0 wt %.

EXAMPLES

The following examples illustrate some embodiments of the present pigments, inks, and methods that are presently known. However, it is to be understood that the following are only exemplary or illustrative of the application of the principles of the present compositions, systems, and methods. Numerous modifications and alternative compositions, methods, and systems may be devised by those skilled in the art without departing from the spirit and scope of the present systems and methods. The appended claims are intended to cover such modifications and arrangements. Thus, while the present pigments, inks, and methods have been described above with particularity, the following examples provide further detail in connection with what are presently deemed to be the acceptable embodiments.

Example 1

Viscosity Modifying Polymer Particulate Synthesis

A viscosity modifying polymer was prepared by polymerizing styrene/hexyl methacrylate/methacrylic acid/ethylene glycol dimethacrylate at a weight ratio of 20/73/6/1. The above monomer mixture (100 g) was emulsified in water (20 ml) with Rhodafac RS 710 (30 wt % solids) (3.3 g). Water (130 ml) was heated to 90° C. Then, solid potassium persulfate (0.35 g) was added to the hot water followed by the emulsion over a period of 10 min. The reaction mixture was maintained at 90° C. for another 3 hours and cooled to ambient temperature. The composition was then filtered through 200 mesh filter to obtain latex with about 40 wt % solid.

Example 2

Encapsulation of Pigment with the Viscosity Modifying Polymer Particulate

A pigment, Printex25 from Degussa, (186.4 g) was dispersed in water (2020 ml) in the presence of surfactant Lutensol AT 50 from BASF (18.64 g). The dispersions from Example 1 (10 g) was mixed with the monomer mixture styrene/hexyl methacrylate/methacrylic acid/ethylene glycol dimethacrylate at a weight ratio of 20/73/6/1 (16 g) along with hexadecane (0.6 g). It was stirred vigorously to obtain an emulsion. Then, the above pigment dispersion (200 g) was mixed thoroughly and microfluidized at 90 psi for three passes. The dispersed solution was collected and mixed with potassium persulfate initiator (0.4 g). This mixture was then heated to 90° C. for 17 hours, and was cooled and neutralized to a pH of 8.5 with potassium hydroxide solution. The product was then filtered with 200 mesh filter to obtain fully encapsulated pigment particles.

While the disclosure has been described with reference to certain preferred embodiments, those skilled in the art will appreciate that various modifications, changes, omissions, and substitutions can be made without departing from the spirit of the disclosure. It is intended, therefore, that the invention be limited only by the scope of the following claims.

What is claimed is:

1. An encapsulated pigment, comprising:
   a pigment;
   an encapsulating polymer that encapsulates the pigment; and
   a viscosity modifying polymer particulate that is cross-linked and which is dispersed within the encapsulating polymer;
   wherein the encapsulated pigment has a pigment to viscosity modifying polymer particulate ratio of 1:10 and 1:0.05 by weight; and
   wherein the encapsulated pigment has an encapsulating polymer to viscosity modifying polymer particulate ratio of 10:0.1 to 1:8 by weight.

2. The encapsulated pigment of claim 1, wherein the pigment is fully encapsulated.

3. The encapsulated pigment of claim 1, wherein the encapsulating polymer and the viscosity modifying polymer particulate individually comprise polymerized monomers individually selected from the group consisting of hydrophobic monomers, hydrophilic monomers, and mixtures thereof.

4. The encapsulated pigment of claim 3, wherein the hydrophobic monomers are individually selected from the group consisting of styrene, p-methyl styrene, vinyl acetate, methyl methacrylate, hexyl acrylate, hexyl methacrylate, 2-ethylhexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, isobornyl methacrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and mixtures thereof.

5. The encapsulated pigment of claim 3, wherein the hydrophilic monomers are individually selected from the group consisting of acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfo ethyl methacrylic acid, sulfopropyl acrylic acid, styrene sulfonic acid, styrene sulfonates, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and mixtures thereof.

6. The encapsulated pigment of claim 1, wherein the viscosity modifying polymer particulate is cross-linked with a cross-linker selected from the group consisting of ethylene glycol diacrylate, ethylene glycol dimethacrylate, propylene glycol dimethacrylate, tetraethylene glycol diacrylate, tetraethylene glycol diacrylate, pentaerythritol triacrylate, pentaerythritol tetraacrylate, and mixtures thereof.

7. The encapsulated pigment of claim 1, wherein the viscosity modifying polymer particulate and the encapsulating polymer has at least one monomer in common.

8. The encapsulated pigment of claim 1, wherein the encapsulating polymer has at least one monomer different than that of the viscosity modifying polymer particulate.

9. The encapsulated pigment of claim 1, wherein the encapsulating polymer includes monomers used in the viscosity modifying polymer particulate with at least one additional monomer.

10. The encapsulated pigment of claim 9, wherein the additional monomer is a linear monomer.

11. The encapsulated pigment of claim 1, wherein the encapsulated pigment comprises about 15 wt % to about 40 wt % of the viscosity modifying polymer particulate.

12. An ink-jet ink, comprising:
an ink vehicle; and
an encapsulated pigment dispersed in the ink vehicle, the encapsulated pigment comprising:
a pigment;
an encapsulating polymer that encapsulates the pigment;
a viscosity modifying polymer particulate that is cross-linked and which is dispersed within the encapsulating polymer;
wherein the encapsulated pigment has a pigment to viscosity modifying polymer particulate ratio of 1:10 and 1:0.05 by weight; and
wherein the encapsulated pigment has an encapsulating polymer to viscosity modifying polymer particulate ratio of 10:0.1 to 1:8 by weight.

13. The ink jet ink of claim 12, wherein the ink vehicle is an aqueous ink vehicle and the encapsulated pigment is present in the aqueous ink vehicle from about 0.5 wt % to about 40 wt % of the ink.

14. A method for manufacturing an encapsulated pigment, comprising:
dispersing a pigment in a solvent;
adding at least one monomer to the solvent to form a mixture;
adding a viscosity modifying polymer particulate that is crosslinked to the mixture; and
polymerizing the at least one monomer thereby forming the encapsulated pigment;
wherein the encapsulated pigment has the viscosity modifying polymer particulate dispersed within the encapsulating polymer;
wherein the encapsulated pigment has a pigment to viscosity modifying polymer particulate ratio of 1:10 and 1:0.05 by weight; and
wherein the encapsulated pigment has an encapsulating polymer to viscosity modifying polymer particulate ratio of 10:0.1 to 1:8 by weight.

15. The method of claim 14, the method further comprising forming an emulsion after adding the viscosity modifying polymer particulate to the mixture.

16. The method of claim 14, wherein the solvent is an aqueous solvent system and the encapsulated pigment is fully encapsulated.

17. The method of claim 14, wherein the viscosity modifying polymer particulate increases the viscosity of the mixture by about 5 cps to about 200 cps.

\* \* \* \* \*

UNITED STATES PATENT AND TRADEMARK OFFICE
CERTIFICATE OF CORRECTION

PATENT NO. : 8,198,346 B2
APPLICATION NO. : 12/831818
DATED : June 12, 2012
INVENTOR(S) : Sivapackia Ganapathiappan It is certified that error appears in the above-identified patent and that said Letters Patent is hereby corrected as shown below:

In column 8, line 54, in Claim 4, delete "trydecyl" and insert -- tridecyl --, therefor.

In column 8, line 62, in Claim 5, delete "ethylidineacetic acid, propylidineacetic acid, crotonoic" and insert -- ethylideneacetic acid, propylideneacetic acid, crotonic --, therefor.

In column 8, line 67, in Claim 5, delete "N-vinylsuccinamidic" and insert -- N-vinylsuccinamic --, therefor.

In column 9, line 2, in Claim 5, delete "sulfo ethyl" and insert -- sulfoethyl --, therefor.

In column 10, line 7, in Claim 13, delete "ink jet" and insert -- ink-jet --, therefor.

In column 10, line 17, in Claim 14, delete "crosslinked" and insert -- cross-linked --, therefor.

In column 10, line 20, in Claim 14, delete "wherein the" and insert -- wherein --, therefor.

Signed and Sealed this
Eighth Day of January, 2013

David J. Kappos
*Director of the United States Patent and Trademark Office*